US012639363B2

(12) United States Patent
Jacobson et al.

(10) Patent No.: US 12,639,363 B2
(45) Date of Patent: May 26, 2026

(54) SYSTEMS AND METHODS FOR DISCOVERY OF MEDIA ITEMS THROUGH DESCRIPTORS

(71) Applicant: Spotify AB, Stockholm (SE)

(72) Inventors: Kurt Jacobson, Stoneham, MA (US); Stanislav Chekalin, Brooklyn, NY (US); Philip Glenny Edmonds, Arlington, MA (US); Matthew Budelman, Providence, RI (US); Paul Lamere, Bath, ME (US); Nicola Felaco, Naples (IT)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 18/324,053

(22) Filed: May 25, 2023

(65) Prior Publication Data

US 2024/0394297 A1     Nov. 28, 2024

(51) Int. Cl.
G06F 16/438 (2019.01)
G06F 3/0482 (2013.01)
(Continued)

(52) U.S. Cl.
CPC ........ G06F 16/4387 (2019.01); G06F 3/0482 (2013.01); G06F 16/435 (2019.01); G06F 40/20 (2020.01)

(58) Field of Classification Search
None
See application file for complete search history.

(56) References Cited

U.S. PATENT DOCUMENTS 8,566,329 B1 * 10/2013 Freed ................ G06F 16/24578
                                                    707/913
2006/0195790 A1 * 8/2006 Beaupre ................ H04L 63/105
                                                    706/18
(Continued)

FOREIGN PATENT DOCUMENTS

CN        107967280 A     4/2018
CN        113268629 A     8/2021

OTHER PUBLICATIONS

Zangerle et al., "Leveraging affective hashtags for ranking music recommendations", IEEE Transactions on Affective Computing, vol. 12, No. 1, Jun. 12, 2018, 14 pgs.
(Continued)

*Primary Examiner* — Henry Orr
(74) *Attorney, Agent, or Firm* — Morgan, Lewis & Bockius LLP

(57)            ABSTRACT
A computer system associated with a media-providing service obtains a set of text descriptors from a plurality of media items in a pool of media items personalized for a first user. The system selects, from the set of text descriptors, a first text descriptor using first criteria and a second text descriptor using second criteria. The system causes an application associated with the media-providing service, executing on a client device of the first user, to concurrently display a first option for playing back a first playlist of media items associated with the first text descriptor and a second option for playing back a second playlist of media items associated with the second text descriptor. In response to receiving selection by the first user of the first option, the system provides, to the application, media items from the first playlist of media items associated with the first text descriptor.

21 Claims, 10 Drawing Sheets

(51) Int. Cl.

| | |
|---|---|
| *G06F 16/435* | (2019.01) |
| *G06F 40/20* | (2020.01) |

(56) References Cited

U.S. PATENT DOCUMENTS

| | | | | |
|---|---|---|---|---|
| 2010/0042615 | A1* | 2/2010 | Rinearson | G06F 16/9535 |
| | | | | 707/E17.014 |
| 2010/0175031 | A1* | 7/2010 | Alton | G06F 16/748 |
| | | | | 715/841 |
| 2012/0005209 | A1* | 1/2012 | Rinearson | G06F 16/285 |
| | | | | 707/754 |
| 2013/0304818 | A1* | 11/2013 | Brumleve | G06Q 30/02 |
| | | | | 709/204 |
| 2014/0180762 | A1* | 6/2014 | Gilbert | G06Q 30/02 |
| | | | | 705/7.29 |
| 2015/0278226 | A1* | 10/2015 | Franks | G06F 16/24578 |
| | | | | 707/728 |
| 2016/0360266 | A1* | 12/2016 | Wilms | H04N 21/4756 |
| 2017/0206196 | A1 | 7/2017 | Raichelgauz et al. | |
| 2018/0046682 | A1* | 2/2018 | Rinearson | G06Q 30/02 |
| 2018/0129659 | A1* | 5/2018 | Jehan | G06F 16/24578 |
| 2018/0307751 | A1* | 10/2018 | Lim | G06Q 30/0631 |
| 2018/0314959 | A1* | 11/2018 | Apokatanidis | G06N 5/04 |
| 2019/0155840 | A1* | 5/2019 | O'Konski | G06F 16/636 |
| 2019/0243885 | A1* | 8/2019 | Pachikov | G06F 3/0482 |
| 2020/0125575 | A1* | 4/2020 | Ghoshal | G06F 3/0482 |
| 2022/0269709 | A1* | 8/2022 | Klamra | G06F 16/5846 |
| 2023/0273955 | A1* | 8/2023 | Bates | G06F 16/687 |
| | | | | 707/723 |
| 2023/0283849 | A1* | 9/2023 | Doshi | H04N 21/472 |
| | | | | 725/61 |

OTHER PUBLICATIONS

Huo, "Music Personalized Label Clustering and Recommendation Visualization" Hindawi Complexity, vol. 2021, Article ID 5513355, Mar. 30, 2021, 8 pgs.

* cited by examiner

Electronic Device
102-1

Figure 5A:
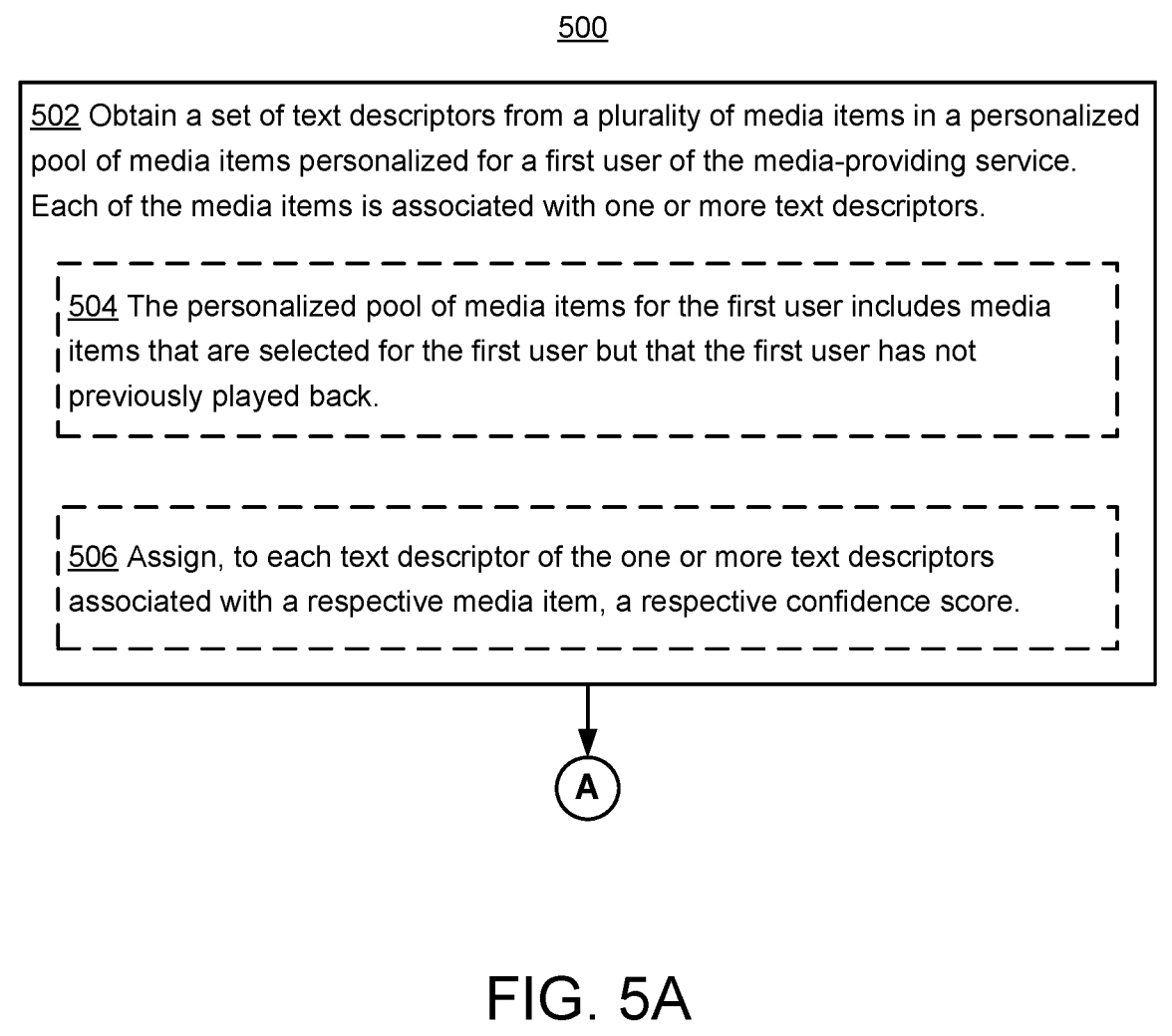

500

502 Obtain a set of text descriptors from a plurality of media items in a personalized pool of media items personalized for a first user of the media-providing service. Each of the media items is associated with one or more text descriptors.

504 The personalized pool of media items for the first user includes media items that are selected for the first user but that the first user has not previously played back.

506 Assign, to each text descriptor of the one or more text descriptors associated with a respective media item, a respective confidence score.

(A)

FIG. 5A 500 (cont'd)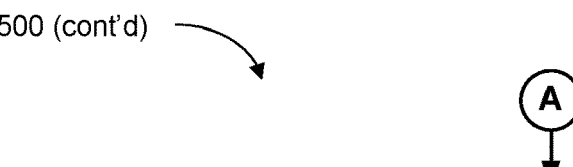

(A)

508 Select, without user input, a first text descriptor from the set of text descriptors by analyzing the set of text descriptors using one or more first criteria.

510 Rank the set of text descriptors to form a first ranked list of the text descriptors and select the first text descriptor based on the first ranked list 512 Obtain a second set of text descriptors corresponding to a listening history of the first user.

514 Compare the second set of text descriptors against the set of text descriptors using the one or more first criteria.

516 Select the first text descriptor in accordance with the comparing.

518 Translate the set of text descriptors from the plurality of media items into a first set of embeddings in a vector space.

520 Translate a listening history of the first user into a second set of embeddings in the vector space.

522 Identify an embedding based on the first set of embeddings and the second set of embeddings, wherein the identified embeddings corresponds to the first text descriptor.

523 Input the set of text descriptors from the plurality of media items and a second set of text descriptors from a listening history of the first user into a trained machine learning model that is configured to output the first text descriptor using the set of one or more first criteria.

(B)

FIG. 5B 500 (cont'd)

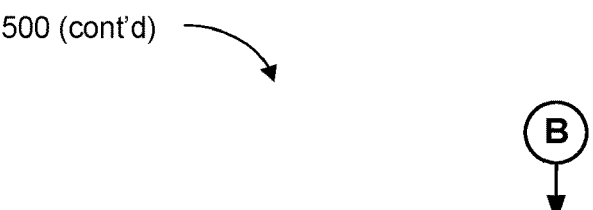

Ⓑ

524 Select, without user input, a second text descriptor from the set of text descriptors by analyzing the set of text descriptors using one or more second criteria, distinct from the one or more first criteria.

> 526 Rank the set of text descriptors to form a second ranked list of the text descriptors, having a different order than the first ranked list of text descriptors, and select the second text descriptor based on the second ranked list.

528 Cause an application associated with the media-providing service, executing on a client device of the first user, to concurrently display (i) a first option for playing back a first playlist of media items associated with the first text descriptor and (ii) a second option for playing back a second playlist of media items associated with the second text descriptor.

> 530 The first option and the second option are concurrently displayed in a user interface for searching for media items.

532 Receive a selection by the first user of the first option.

534 In response to user selection by the first user of the first option, provide, to the application executing on the client device of the first user, media items from the first playlist of media items associated with the first text descriptor.

536 Select a video related to the first playlist of media items associated with the first text descriptor to display with the first option.

538 In response to user selection by the first user of the first option, transition to a user interface for the first playlist of media items associated with the first text descriptor. The user interface includes selectable affordances for a plurality of text descriptors other than the first text descriptor.

540 The plurality of text descriptors other than the first text descriptor includes a third text descriptor.

542 In response to user selection by the first user of the third text descriptor, provide, to the application executing on the client device of the first user, media items from a third playlist of media items associated with the third text descriptor, wherein the third playlist is distinct from the first playlist and the second playlist.

FIG. 5D 500 (cont'd)

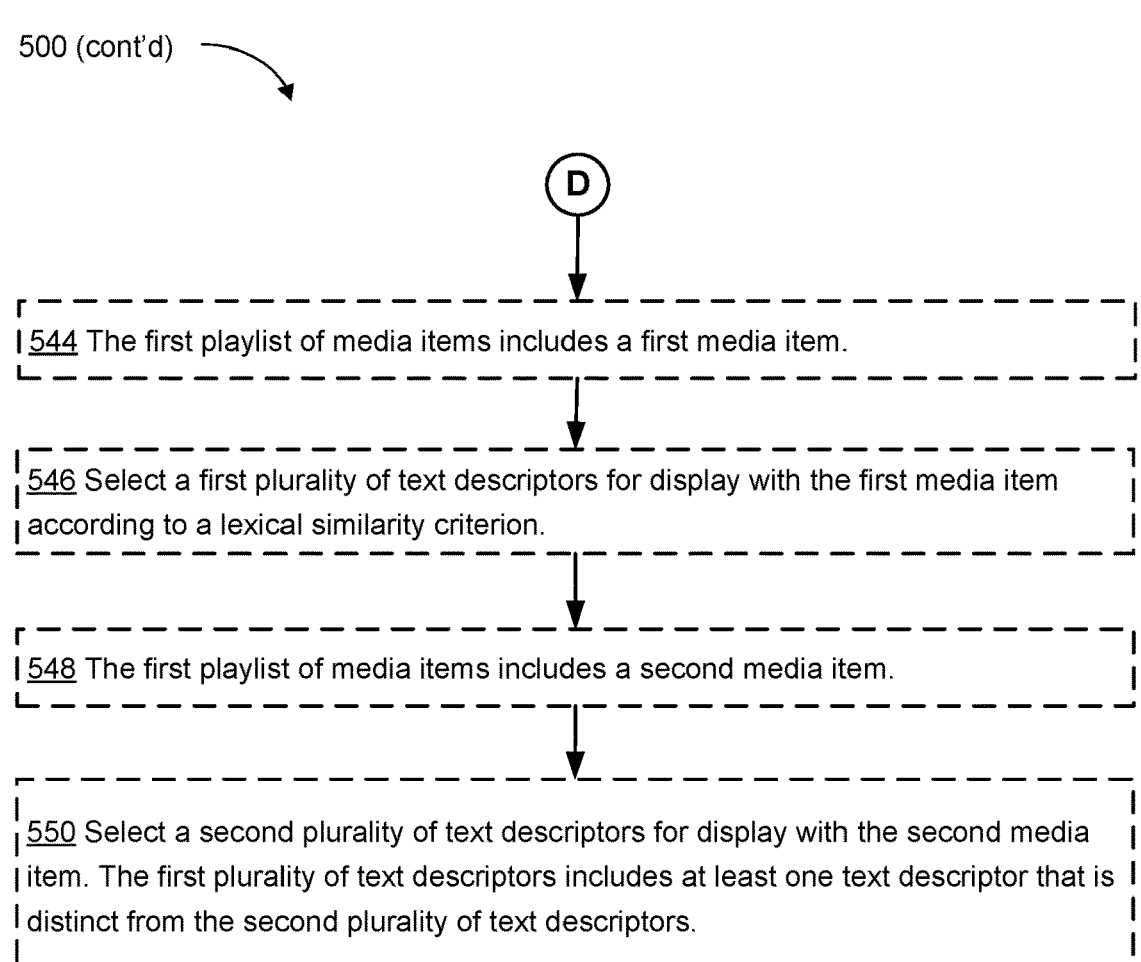

Ⓓ

544 The first playlist of media items includes a first media item.

546 Select a first plurality of text descriptors for display with the first media item according to a lexical similarity criterion.

548 The first playlist of media items includes a second media item.

550 Select a second plurality of text descriptors for display with the second media item. The first plurality of text descriptors includes at least one text descriptor that is distinct from the second plurality of text descriptors.

FIG. 5E

SYSTEMS AND METHODS FOR DISCOVERY OF MEDIA ITEMS THROUGH DESCRIPTORS

TECHNICAL FIELD

The disclosed embodiments relate generally to media provider systems, and, in particular, to recommending media items personalized for a user based on text descriptors associated with media items.

BACKGROUND

Recent years have shown a remarkable growth in consumption of digital goods such as digital music, movies, books, and podcasts, among many others. The overwhelmingly large number of these goods often makes navigation and discovery of new digital goods an extremely difficult task. To cope with the constantly growing complexity of navigating the large number of goods, media content providers provide recommendations to help users discover media content, improving the convenience with which users can digest and experience such content.

SUMMARY

Some embodiments of the present disclosure provide improved systems and methods for generating personalized recommendations for media items, by analyzing text descriptors associated with media items.

In the disclosed embodiments, a media content provider analyzes a set of text descriptors (e.g., hash tags, metadata information) associated with media items (e.g., songs) in a personalized pool of media items associated with a user. The personalized pool of media items can be a personalized discovery pool (e.g., a pool of songs that the user has not listened to, but that the media content provider determines the user is likely to enjoy) or the user's listening history. In some embodiments, the media content provider analyzes the set of text descriptors in different ways (e.g., using different predetermined criteria) and selects one or more text descriptors according to one or more criteria. In some embodiments, the media content provider provides (e.g., selects, generates), for a text descriptor, a respective playlist of media items (e.g., previews or clips) associated with the respective descriptor and displays the respective playlist as an option (e.g., in the form of a user-selectable icon) in an application executing on a client device of the user. In some embodiments, each option serves as an "entry point" for the user to discover and interact with new music. In some embodiments, user selection of a first option, corresponding to a first playlist, causes a user interface for the first playlist to be displayed alongside other text descriptors. The user can select these other text descriptors to explore other media feeds or to refine the first playlist according to the other text descriptors. Thus, the disclosed systems and methods improve user experience associated with discovering and interacting with media items. It should be noted that, although certain embodiments are described with respect to "discovery" of new media items, e.g., through previews or clips, the embodiments of the present disclosure may be used for a variety of purposes and in a variety of forms (e.g., to provide playlists of full-length media content items that are already familiar to the user).

Thus, some embodiments of the present invention provide a technical solution to the problem of navigation and discovery of media items in an overwhelmingly large collection (e.g., millions of media items). In particular, these embodiments improve the interface of modern electronic devices, by providing faster access to desirable media with fewer user inputs, thus making the machine-human interaction more efficient (e.g., through more efficient use of limited display size) and reducing the amount of processing and battery power required from the electronic device.

To that end, in accordance with some embodiments, a method is provided. The method includes obtaining a set of text descriptors from a plurality of media items in a pool of media items personalized for a first user of a media-providing service. Each of the media items is associated with one or more text descriptors. The method includes selecting, without user input, a first text descriptor from the set of text descriptors by analyzing the set of text descriptors using one or more first criteria. In some embodiments, the method includes selecting, without user input, a second text descriptor from the set of text descriptors by analyzing the set of text descriptors using one or more second criteria, distinct from the one or more first criteria. The method includes causing an application associated with the media-providing service, executing on a client device of the first user, to concurrently display a first option for playing back a first playlist of media items associated with the first text descriptor and, in some embodiments, a second option for playing back a second playlist of media items associated with the second text descriptor. The method includes receiving a selection by the first user of the first option. The method also include, in response to user selection by the first user of the first option, providing, to the application executing on the client device of the first user, media items from the first playlist of media items associated with the first text descriptor.

In accordance with some embodiments, a computer system (e.g., a server system or an electronic device) is provided. The electronic device includes one or more processors and memory storing one or more programs. The one or more programs include instructions for performing any of the methods described herein.

In accordance with some embodiments, a non-transitory computer-readable storage medium is provided. The non-transitory computer-readable storage medium stores one or more programs for execution by a computer system with one or more processors. The one or more programs comprise instructions for performing any of the methods described herein.

Thus, systems are provided with improved methods and systems for discovering and interacting with media items, e.g., through text descriptors.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 5A-5E are flow diagrams illustrating a method of recommending media items based on text descriptors, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
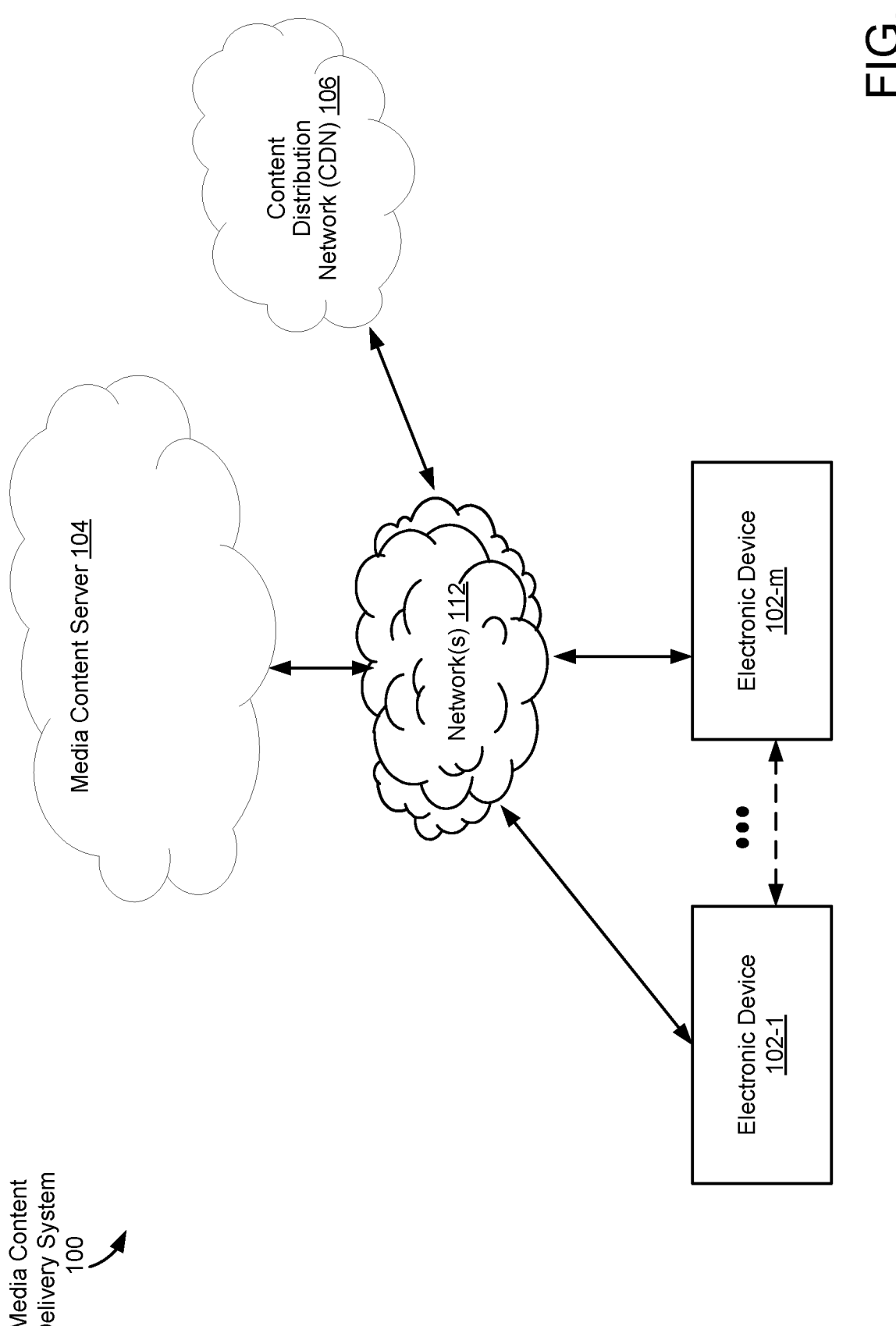
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-m, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, an infotainment system, digital media player, a speaker, television (TV), and/or any other electronic device capable of presenting media content (e.g., controlling playback of media items, such as music tracks, podcasts, videos, etc.). Electronic devices 102 may connect to each other wirelessly and/or through a wired connection (e.g., directly through an interface, such as an HDMI interface). In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, podcasts, movies, videos, or other media items, or playlists thereof) to media content server 104 through network(s) 112. Additionally, electronic devices 102-1 and 102-m, in some embodiments, also send indications of media content items to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of music tracks, playlists, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
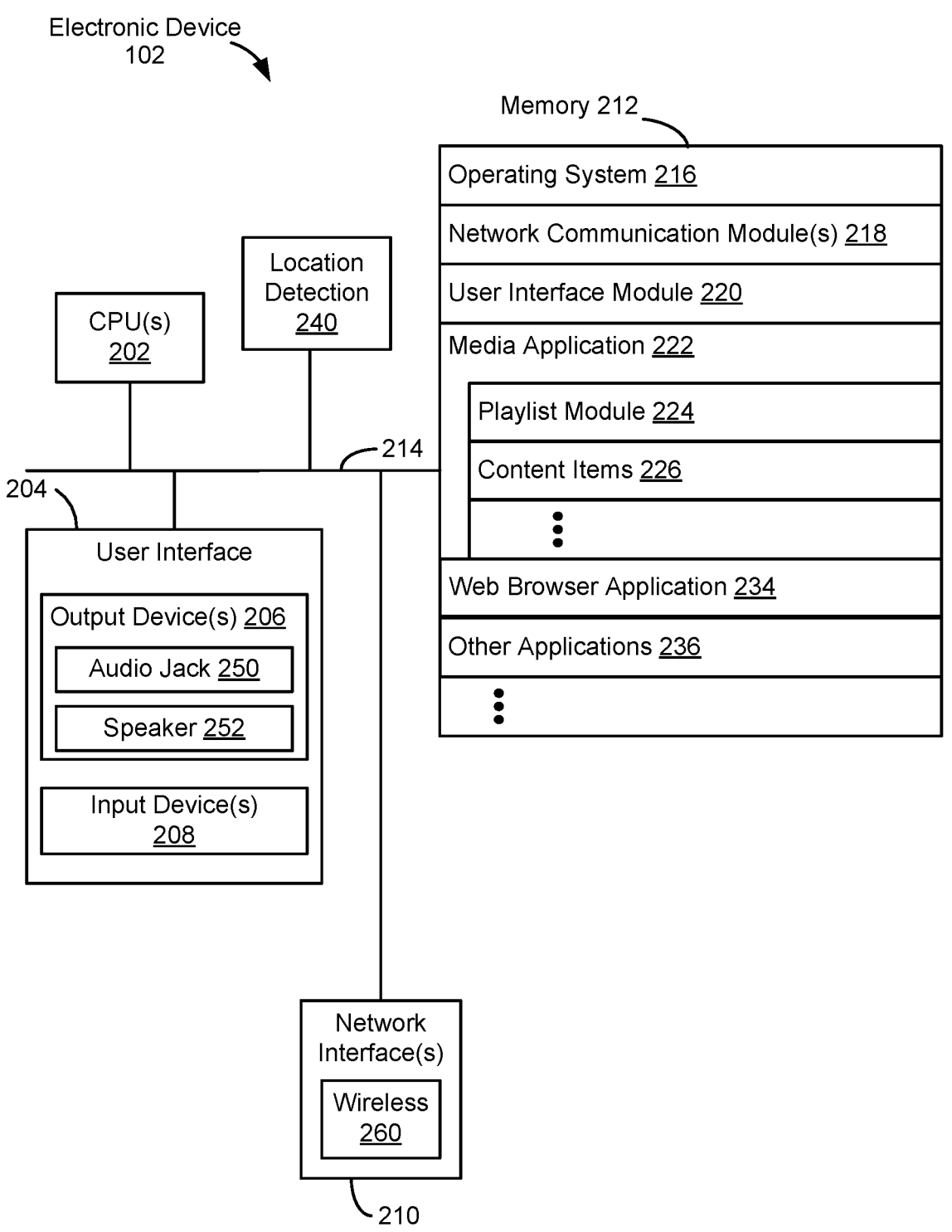
FIG. 2 is a block diagram illustrating an electronic device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses

214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices.

Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

an operating system 216 that includes procedures for handling various basic system services and for performing hardware-dependent tasks;

network communication module(s) 218 for connecting the client device 102 to other computing devices (e.g., media presentation system(s), media content server 104, and/or other client devices) via the one or more network interface(s) 210 (wired or wireless) connected to one or more network(s) 112;

a user interface module 220 that receives commands and/or inputs from a user via the user interface 204 (e.g., from the input devices 208) and provides outputs for playback and/or display on the user interface 204 (e.g., the output devices 206);

a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:

a playlist module 224 for storing sets of media items for playback in a predefined order, the media items selected by the user (e.g., for a user-curated playlist) and/or the media items curated without user input (e.g., by the media content provider);

a content items module 226 for storing media items, including audio items such as podcasts and songs, for playback and/or for forwarding requests for media content items to the media content server;

a web browser application 234 for accessing, viewing, and interacting with web sites; and other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
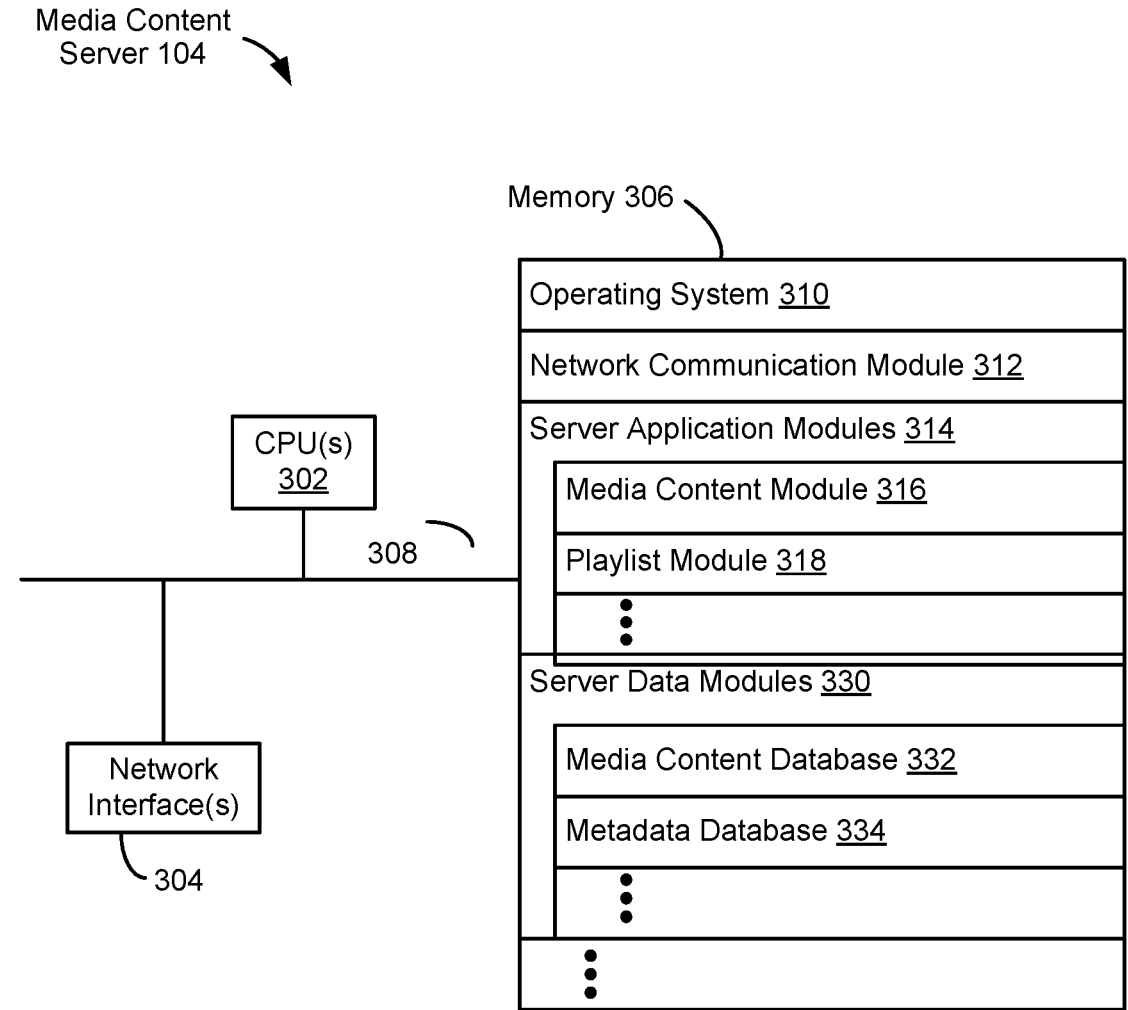
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the media content server 104 to other computing devices via one or more network interfaces 304 (wired or wireless) connected to one or more networks 112;

one or more server application modules 314 for performing various functions with respect to providing and managing a content service, the server application modules 314 including, but not limited to, one or more of:

a media content module 316 for storing one or more media content items and/or sending (e.g., streaming), to the electronic device, one or more requested media content item(s);

a playlist module 318 for storing and/or providing (e.g., streaming) sets of media content items to the electronic device;

one or more server data module(s) 330 for handling the storage of and/or access to media items and/or metadata relating to the media items; in some embodiments, the one or more server data module(s) 330 include:

a media content database 332 for storing media items; and a metadata database 334 for storing metadata relating to the media items, including a genre associated with the respective media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous Javascript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein.

In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4A:
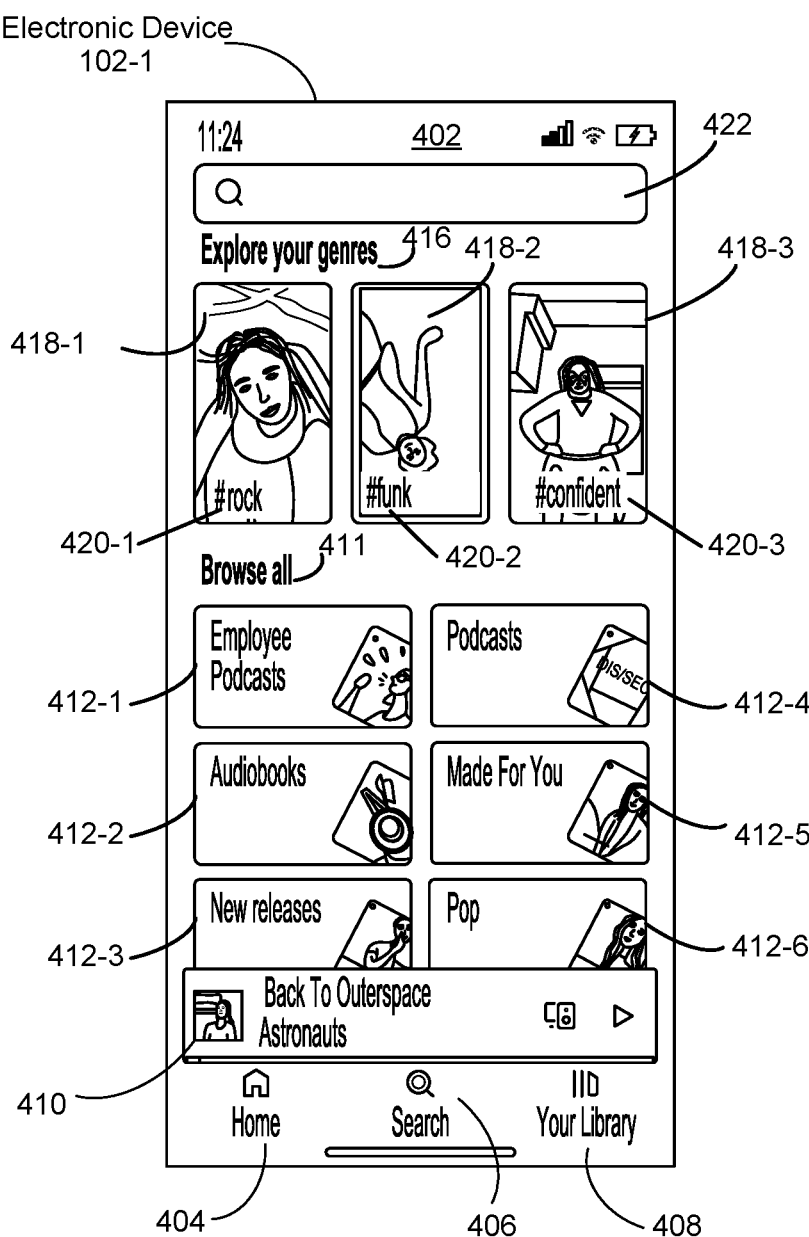
FIGS. 4A and 4B are example user interfaces that are displayed on an electronic device, in accordance with some embodiments.
Figure 4B:
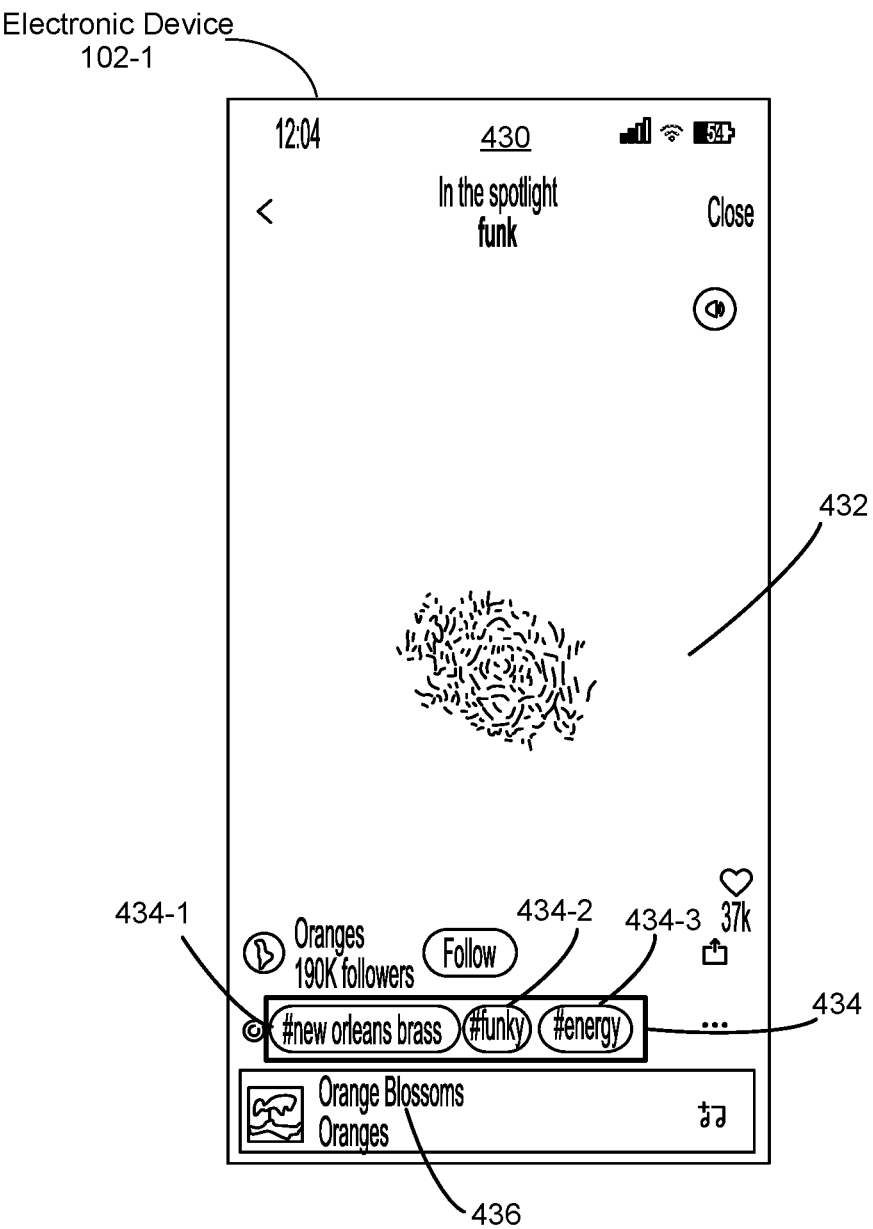

FIGS. 4A and 4B are example user interfaces that are displayed on an electronic device 102-1, in accordance with some embodiments.

FIG. 4A shows a user interface 402 for an application (e.g., media application 222) of a media-providing service executing on the electronic device 102-1. The user interface 402 includes a "Home" icon 404 (e.g., a user-selectable icon, a button, etc.) (e.g., a "Home" button) that, when selected by a user, presents an interface (e.g., a different interface from the user interface 402) for accessing media items selected to appear on the home screen (e.g., recommendations based on the user's listening history, podcasts/shows followed by the user). The user interface 402 includes a "Search" icon 406 that, when selected by a user, enables a user to find media items that are stored on the electronic device 102-1 or on a server 104 (e.g., media content server 104) that is electronically communicated with the electronic device 102-1. The user interface 402 includes a "Your library" icon 408, which, when selected by a user, enables a user to access media items that are saved by the user.

In some embodiments, the user interface 402 is an interface corresponding to "Search" icon 406. Stated another way, the user interface 402 is an interface for searching for media items (e.g., user interface 402 is the user interface that is initially displayed in response to the user selected search icon 406). In some embodiments, the user interface 402 is also referred to as an interface corresponding to the search tab of the application. As shown in FIG. 4A, user interface includes an indication 410 of a currently playing media item (e.g., the track "Back to Outerspace" by the artist "Astronauts"). The indication 410 includes a limited set of controls (e.g., a play button when the media item is paused, which turns into a pause button when the media item is played). In some embodiments, the indication 410 remains in the position shown as the user scrolls through the user interface 402.

In some embodiments, the user interface 402 includes a search box 422. A user can input a text command or a voice command in the search box 422 to search for media items that are stored on the electronic device 102-1 or the server 104.

In some embodiments, the user interface 402 displays an "Explore your genres" section 416, which includes one or more options 418. In some embodiments, a respective option 418 is accompanied by (e.g., associated with) a respective text descriptor 420 (e.g., a hashtag, a descriptor defined by a user, a descriptor defined by a media-providing service, a metadata field, etc.). For example, FIG. 4A shows a first option 418-1 that is associated with a first text descriptor 420-1 (e.g., #rock), a second option 418-2 that is associated with a second text descriptor 420-2 (e.g., #funk), and a third option 418-3 associated with a third text descriptor (e.g., #confident). Although the three text descriptors in FIG. 4A are #rock, #funk, and #confident, in reality, they could be any distinct text descriptors. In some embodiments, the text descriptors, and the corresponding playlists that are accessible through the options 418, are selected as described with respect to method 500, as described below with respect to FIGS. 5A-5E.

In the example of FIG. 4A, the user interface 402 displays three options 418-1 to 418-3. In some embodiments, the user interface 402 can display any number of options, such as one, two, three, or more than three options. In some instances, where there are more options available than can be accommodated on the screen size of the device, the user interface 402 can include a scroll bar that enables a user to view more options by scrolling on the scroll bar (e.g., horizontally or vertically). In some embodiments, the user can dismiss individual options 418, which are then repopulated with new options 418 (e.g., with different descriptors and different playlists).

In some embodiments, each of the options 418 represents an "entry point" for a user to discover media items corresponding to the associate description. For example, in some embodiments, a respective option 418 corresponds to an option for playing back a playlist of media items associated with the accompanying text descriptor. Thus, the three options 418-1, 418-2, and 418-3 in FIG. 4A correspond to three entry points, which provide three potential ways for a user to start the discovery experience. For example, when the user clicks on the option 418-1 (or on the text descriptor 420-1 "#rock" associated with the option 418-1), the user will be presented with a playlist of media items associated with the text descriptor #rock. In some embodiments, each media item in the playlist has its own set of text descriptors.

In some embodiments, each of the text descriptors 420 that is displayed on the user interface 402 (and its corresponding playlist) is selected (e.g., by the media content server 104) from a set of text descriptors using a respective distinct set of one or more criteria. For example, the first text descriptor 420-1 associated with the first option 418-1 may be intended to provide music that feels very familiar to the user (and thus is selected in accordance with first criteria, which correspond to a first level of familiarity with media items in the corresponding playlist), whereas the third text descriptor 420-3 associated with the third option 418-3 may be intended to push the user's boundaries (e.g., provide a less familiar, more niche playlist), and thus is selected in accordance with second criteria, which correspond to a second level of familiarity with media items in the corresponding playlist (the second level of familiarity being less familiar than the first level of familiarity). Various ways in which criteria are used to select text descriptors are described in greater detail with respect to method 500 (FIGS. 5A-5E).

In some embodiments, the set of text descriptors is obtained (e.g., by the media content server 104) from a pool of media items personalized for the user. In some embodiments, each of the media items is associated with one or more text descriptors. In some embodiments, the media items and the text descriptors have a many-to-many relationship (e.g., a media item can be associated with many text descriptors. Similarly, the same text descriptor can be associated with many media items). In some embodiments, a text descriptor is assigned a respective confidence score for being associated with a respective media item. The respective confidence score can indicate a confidence (or likelihood) that the text descriptor accurately describes the respective media item.

FIG. 4A also illustrates that in some embodiments, the user interface 402 includes a "Browse all" section 415. The "Browse all" section 415 includes affordances 412 (e.g., user selectable icons, user-selectable boxes, etc.) (e.g., affordances 412-1 to 412-6), each corresponding to respective category such as audiobooks (corresponding to affordance 412-2), new releases (corresponding to affordance 412-3), and podcasts (corresponding to affordance 412-4). A user can select (e.g., click on) a respective affordance 412 to explore a vast collection of featured audiobooks, playlists, new launches, or podcasts, etc.

FIG. 4B illustrates a user interface 430 that is displayed on the electronic device 102-1 in response to user selection of the option 418-2 in FIG. 4A (or in response to user selection of a text descriptor 420-2 "#Funk" associated with the option 418-2), in accordance with some embodiments. The user interface 430 displays a video 432 corresponding to the first track 436 in the playlist associated with the text descriptor #funk. In some embodiments rather than a video corresponding to the first track 436, the user interface 430 displays cover art or an animation. In some embodiments, the first track 436 includes one or more text descriptors 434 (e.g., text descriptor 434-1 "#new_orleans_brass," text descriptor 434-2 "#funky," and text descriptor 434-3 "#energy"). In some embodiments, the one or more text descriptors change with each track. For example, the one or more text descriptors 434 displayed with the first track 436 in FIG. 4B can correspond to broader genres and text descriptors displayed in subsequent tracks of the playlist can correspond to more specific genres. In some embodiments, the number of text descriptors per track inside a feed (e.g., a playlist) is limited to a predetermined number, such as two, three, or five. In some embodiments, a playlist is a set of media items for playback in a predefined order. In other embodiments, a playlist includes media items that are dynamically curated and/or un-ending (such playlists are sometimes referred to as a "feed"). For example, in some embodiments, as a user browses media item(s) in a playlist, the one or more media content servers 104 select subsequent next media item(s) for the playlist (e.g., based on what the user has already explored) on-the-fly. Thus, as used herein, the term playlist is not necessarily intended to connote a finite list of tracks and/or a list that is determined prior to playback of the playlist, as additional tracks may be added to the playlist "on-the-fly."

In some embodiments, the user can be taken to a next discovery feed (e.g., a New Orleans brass discovery feed) upon user selection (e.g., a click or tap action) of the corresponding text descriptor 434. In some embodiments, a track displays text descriptors other than the text descriptor for the playlist (e.g., feed) that the track is already in. For example, in FIG. 4B, since the user is already playing back the playlist associated with the text descriptor #funk, the text descriptors 434 that are displayed with the track 436 excludes the text descriptor #funk (e.g., because it will then result in a loop where the playlist goes back to #funk).

In some embodiments, a playlist includes a predetermined number of media items (e.g., 8, 10, 12 or 15 media items, such as musical tracks). In some embodiments, one or more text descriptors is included with each media item in the playlist.

According to some embodiments of the present disclosure, the text descriptors have a dual purpose of: (i) helping users understand what kind of media item it is (e.g., funk, rock, hip hop etc. and (ii) giving users control over the discovery experience (e.g., the user is in a #funk playlist but wants to be in a #brass playlist, the user can switch to the #brass playlist by selecting the corresponding text descriptor). Accordingly, in some embodiments, the media-providing service avoids re-using text descriptors in the same playlist to maximize the discovery experience for the user. For example, in some embodiments, the one of more text descriptors accompanying a track change with each track, such that text descriptors that have been used in earlier tracks of the playlist tend not to be repeated in later tracks of the same playlist. In some embodiments, the earlier tracks of the playlist typically display text descriptors associated with broader/top level genres whereas the later tracks in the playlist tend to display text descriptors that are more niche. For example, as a user goes through a rock feed (e.g., playlist) (e.g., in response to user selection of the option 418-1 in FIG. 4A), the user can eventually find text descriptors like "#90s," "#alternative_rock," and "#classic_rock," which facilitate the discovery of other media items and/or playlists when the user selects one or more of these other text descriptors.

FIGS. 5A-5E are flow diagrams illustrating a method of recommending media items based on text descriptors, in accordance with some embodiments. In some embodiments, the media item recommendations are provided to a user within a discovery feed (e.g., within a "Search" tab or "Search" icon 406 of a user interface, as illustrated in FIG. 4A) (e.g., for the user to discover what they might want to listen to), in accordance with some embodiments. Method 500 may be performed at a server system associated with a media-providing service (e.g., media content server 104) or an electronic device (e.g., electronic device(s) 102) in electronic communication with a server system associated with the media-providing service. In some embodiments, the method 500 is performed by a combination of the server system (e.g., including media content server 104 and CDN 106) and a client device.

Referring now to FIG. 5A, in performing the method 500, the server system obtains (502) a set of text descriptors (e.g., hashtags, descriptors defined by a user or by a media-providing service, metadata fields, etc.) from a plurality of media items in a pool of media items personalized for a first user of the media-providing service. Each of the media items is associated with one or more text descriptors. In some embodiments, obtaining the set of text descriptors comprises selecting/collecting the text descriptors for two or more (or each) media item in the set of media items. In some embodiments, as described below, each text descriptor is associated with a score/confidence value with respect to a media item, and obtaining the set of text descriptors comprises selecting/collecting the text descriptors that have a score/confidence above a threshold for two or more (or each) media item in the set of media items (e.g., selecting/collecting the text descriptors that have at least an 80% confidence value as corresponding to at least one media item in the personalized pool of media items).

In some embodiments, the method includes generating the pool of media items personalized for the first user. In some embodiments, generating the pool of media items personalized for the first user comprises providing an identifier of the first user (or a listening history of the first user) to a sub-system for generating pools of media items and receiving the pool (e.g., identifiers of a set of media items) that are selected by the sub-system in accordance with the identifier of the first user (or the listening history of the first user). In some embodiments, the sub-system uses the identifier of the first user to access the listening history of the first user, and generates the pool based on the listening history of the first user.

In some embodiments, the personalized pool of media items for a first user includes (504) media items that are selected for the user but that the user has not previously played back (e.g., the pool includes media items that are similar to media items that the first user has listened to). In some embodiments, the pool includes the listening history of the first user.

In some embodiments, the server system assigns (506), to each text descriptor of the one or more text descriptors associated with a respective media item, a respective confidence score. For example, the respective confidence score indicates a confidence that the respective text descriptor accurately describes the respective media item. In some embodiments, a text descriptor (e.g., #rock, #jazz, etc.) that is associated with a top level genre tends to have a higher confidence score.

Referring now to FIG. 5B, in some embodiments, the server system selects (508), without user input, a first text descriptor (e.g., text descriptor 420-1, FIG. 4A) from the set of text descriptors by analyzing the set of text descriptors using one or more first criteria.

In some embodiments, selecting the first text descriptor comprises ranking (510) the set of text descriptors (e.g., with respect to satisfaction of the first criteria) to form a first ranked list of the text descriptors and selecting the first text descriptor based on the first ranked list (e.g., selecting the top ranked text descriptor, or randomly selecting from the top 10 ranked text descriptors).

In some embodiments, selecting the first text descriptor from the set of text descriptors includes obtaining (512) a second set of text descriptors corresponding to a listening history of the first user; comparing (514) the second set of text descriptors against the set of text descriptors using the one or more first criteria; and selecting (516) the first text descriptor in accordance with the comparing. For example, the one or more first criteria are met when a descriptor of the set of text descriptors from the personalized pool also occurs (or has a sufficiently high score) in the user's listening history, and thus text descriptors that meet the first criteria are likely to yield familiar content.

For example, in some embodiments, the second set of text descriptors are associated with media items that the first user has previously played back.

In some embodiments, comparing the second set of text descriptors against the set of text descriptors using the one or more first criteria includes applying heuristics. For example, the server system obtains descriptors for all the media items the first user recently played back (e.g., in the past three weeks, past month, past three months, etc.) and/or added to the first user's collections, and chooses the top ones by the sum of text descriptor scores.

In some embodiments, comparing the second set of text descriptors against the set of text descriptors using the one or more first criteria includes applying a weighting criterion. For example, in some embodiments, the server system downranks text descriptors that occur frequently by adjusting the text descriptor's weight relative to an aggregated weight in the set of text descriptors. In some embodiments, the server system up-ranks text descriptors that occur less frequently by adjusting the text descriptor's weight relative to an aggregated weight in the set of text descriptors.

In some embodiments, selecting the first text descriptor from the set of text descriptors using the one or more first criteria includes translating (518) the set of text descriptors from the plurality of media items into a first set of embeddings (e.g., a first vector representation) in a vector space; translating (520) a listening history of the first user into a second set of embeddings (e.g., a second vector representation) in the vector space; and identifying (522) an embedding (e.g., according to a cosine distance) based on the first set of embeddings and the second set of embeddings, wherein the identified embedding corresponds to the first text descriptor.

In some embodiments, selecting the first text descriptor from the set of text descriptors using the one or more first criteria includes inputting (523) the set of text descriptors from the plurality of media items and a second set of text descriptors from a listening history of the first user into a trained machine learning model that is configured to output the first text descriptor using the set of one or more first criteria.

Referring now to FIG. 5C, the server system selects (524), without user input, a second text descriptor (e.g., text descriptor 420-2, FIG. 4A) from the set of text descriptors by analyzing the set of text descriptors using one or more second criteria, distinct from the one or more first criteria. For example, in some embodiments, the second criteria are criteria for selecting a text descriptor that will yield less familiar content.

In some embodiments, selecting the second text descriptor comprises ranking (526) the set of text descriptors to form a second ranked list of the text descriptors, having a different order than the first ranked list of text descriptors, and selecting the second text descriptor based on the second ranked list.

In some embodiments, the one or more first criteria and the one or more second criteria are associated with different predefined musical vibes/styles. In some embodiments, the one or more first criteria and the one or more second criteria are associated with different musical genres, moods and/or aesthetics.

In some embodiments, the one or more first criteria and the one or more second criteria are associated with different predefined objectives. As one example, the first criteria and/or the second criteria can be associated with user familiarity (e.g., more familiar or less familiar, based on a user's own listening history or added to the user's listening collection), and the first text descriptor is associated with media items similar to a user's listening history and the second text descriptor is associated with media items less similar to the user's listening history. As another example, the first criteria and/or the second criteria can be associated with popularity (e.g., more popular or less popular, based on analyzing listening histories of a pool of users of the media-providing service), and the first text descriptor is associated with media items that are more popular according to the listening histories of the user pool and the second text descriptor is associated with media items that are less popular according to the listening histories of the user pool. In yet another example, the first criteria and/or the second criteria can be associated with a degree of specificity of a genre. In this example, the first text descriptor can be associated with a top level genre (e.g., more generic), such as #rock and #pop, whereas the second text descriptor can be something more niche, such as #90s #alternative_rock, or #classic_rock.

In some embodiments, having distinct first and second criteria facilitate the selection of diverse and relevant text descriptors that are subject to (e.g., based partly on) the user's listening history. Thus, in accordance with some embodiments, each user of the media-providing service will have a unique set of text descriptors.

In some embodiments, instead of selecting a first text descriptor and a second text descriptor, selection by the server system of just a single (i.e., one) text descriptor/option is necessary.

With continued reference to FIG. 5C, the server system causes (528) an application (e.g., media application 222) associated with the media-providing service, executing on a client device of the first user, to concurrently display (i) a first option (e.g., option 418-1, FIG. 4A) for playing back a first playlist of media items associated with the first text descriptor (e.g., text descriptor 420-1, FIG. 4A) and (ii) a second option (e.g., option 418-2, FIG. 4A) for playing back a second playlist of media items associated with the second text descriptor (e.g., text descriptor 420-2, FIG. 4A). In some embodiments, a respective playlist of media items comprises a set of media items for playback in a predefined order. In other embodiments, a respective playlist of media items comprises media items that are dynamically curated and/or un-ending (e.g., in the case of a continuous feed). For example, as a user explores media item(s) in a selected playlist, the server system selects the next media item in the playlist on-the-fly, automatically, and without user intervention. Thus, as used herein, the term playlist is not necessarily intended to connote a finite list of tracks and/or a list that is determined prior to playback of the playlist, as additional tracks may be added to the playlist "on-the-fly."

In some embodiments, the first option and the second option are concurrently (530) displayed in a user interface (e.g., user interface 402, FIG. 4A) for searching for media items. This is illustrated in FIG. 4A.

The server system receives (532) a selection by the first user of the first option.

In response to user selection by the first user of the first option, the server system provides (534), to the application executing on the client device of the first user, media items from the first playlist of media items associated with the first text descriptor.

In some embodiments, the media items from the first playlist of media items (and media items from the second playlist of media items) comprise previews or clips (e.g., 5-second, 8-second, or 12-second segments) of full media content items (e.g., the media items are at least portions of full media content items). For example, in some embodiments, the previews or clips begin at a position within the media content item, but not at the beginning. In some embodiments, the previews or clips include separated clips from within the media content item. For example, the media item is a 10-second segment composed of one 5-second clip extracted from the first minute of the media content item and another 5-second clip extracted from the second minute of the media content item.

In some embodiments, the media content items for the playlist are selected from the personalized pool (e.g., randomly selected from a subset media items in the personalized pool that have the first descriptor). In some embodiments, the media content items for the playlist are selected from a larger pool (e.g., the entire media library).

In some embodiments, user selection of a media item enables the user to navigate (e.g., within the application) from that media item into a playlist with the full media content item.

In some embodiments, in response to user selection of one of the media items on the playlist, the server system provides, for display on the application, an updated playlist associated with that media item, wherein the updated playlist includes full tracks of the media items on the first playlist.

In some embodiments, the server system selects (536) a video related to (e.g., based on) the first playlist of media items associated with the first text descriptor to display (e.g., concurrently) with the first option. This is illustrated in FIG.

4A, which shows that each of the options 418 is displayed with a respective image (e.g., video frame, thumbnail, etc.) of a media item and a respective text descriptor 420. In some embodiments, the selected video is associated with a first media item from the first playlist of media items associated with the first text descriptor. In some embodiments, the selected video is a standalone video that is not associated with specific media items (e.g., the video does not have a track linked to it).

In some embodiments, the first text descriptor is associated with a subset of the media items in the plurality of media items. The subset of media items includes the first media item. The first text descriptor is assigned a respective confidence for each media item in the subset of media items. In some embodiments, the server system selects the first media item from the subset of media items in accordance with a determination that the first text descriptor has a highest confidence score for the first media item in the subset of media items. In some embodiments, the video is a short clip provided by the artist or producer of the first media item.

In some embodiments, in response to user selection by the first user of the first option, the server system transitions (538) to a user interface (e.g., user interface 430, FIG. 4B) for the first playlist of media items associated with the first text descriptor. The user interface includes selectable affordances for a plurality of text descriptors other than the first text descriptor. For example, FIG. 4B illustrates that the first track 436 in the playlist includes text descriptor 434-1 "#new_orleans_brass," text descriptor 434-2 "#funky," and text descriptor 434-3 "#energy."

In some embodiments, the plurality of text descriptors other than the first text descriptor includes (540) a third text descriptor (e.g., text descriptor 434-1 "#new_orleans_brass," FIG. 4B). In response to user selection by the first user of the third text descriptor, the server system provides (542), to the application executing on the client device of the first user, media items from a third playlist of media items associated with the third text descriptor, wherein the third playlist is distinct from the first playlist and the second playlist.

In some embodiments, the first playlist of media items includes (544) a first media item. The server system selects (546) a first plurality of text descriptors for display with the first media item (in the user interface) according to a lexical similarity criterion (e.g., between different text descriptors in the set of text descriptors, and/or between different text descriptors in one of the aforementioned ranked lists of text descriptors).

In some embodiments, the lexical similarity criterion comprises a similarity metric, an edit distance etc. Suppose the first media item is associated with a text descriptor having a first string and associated with another text descriptor having a second string. If the first and second strings are determined to be similar to each other based on the lexical similarity criterion, only one or none of the first and second strings will be selected for inclusion as the first plurality of text strings. In one example, "#funk" and "#funky" are not displayed in the same media item because they may be determined by the server system to be similar to each other based on the lexical similarity criterion. In another example, if the numbers of letters that alike in the first string and the second string is 3 or more, or 4 or more, the first string and the second string are deemed to be similar and will not be concurrently included in the first plurality of text descriptors.

In some embodiments, the first playlist of media items includes (548) a second media item. The server system selects (550) a second plurality of text descriptors for display with the second media item (in the user interface). The first plurality of text descriptors includes at least one text descriptor that is distinct from the second plurality of text descriptors. In some embodiments, the second plurality of text descriptors are selected according to the same lexical similarity criterion that is used for selecting the first plurality of text descriptors. In some embodiments, the second plurality of text descriptors are selected according to a different lexical similarity criterion.

Although FIGS. 5A-5E illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
   at a server system associated with a media-providing service:
   generating a personalized pool of media items that are personalized for a first user of the media-providing service based on a listening history of the first user;
   obtaining a set of text descriptors from a plurality of media items in the personalized pool of media items personalized for the first user of the media-providing service, wherein each of the plurality of media items is respectively associated with one or more text descriptors;
   selecting, without user input, a first text descriptor from the set of text descriptors by analyzing the set of text descriptors using one or more first criteria;
   generating, without user input, a first playlist of media items from at least the personalized pool of media items personalized for the first user, wherein each media item in the first playlist of media items is selected for the first playlist of media items based at least on an association with the first text descriptor;
   causing an application associated with the media-providing service, executing on a client device of the first user, to concurrently display a plurality of text descriptors including the first text descriptor;
   in response to the selection of the first text descriptor:
   causing the application associated with the media-providing service to transition from a first user interface of the application to a second user interface of the application;
   while the second user interface is displayed, providing, to the application executing on the client device of the first user, media items in the first playlist of media items associated with the first text descriptor;
   causing the application associated with the media-providing service, executing on a client device of the first user, to playback the provided media items in the first playlist and display, while playing back the provided media items, one or more text descriptors as user-selectable options, wherein the one or more text descriptors displayed as user-selectable options are distinct from the first text descriptor, wherein the one or more text descriptors are refinements of the first text descriptor and are displayed in the second user interface as user-selectable options that change with each media item in the first playlist of media items; and
   in response to detecting selection of a respective text descriptor displayed as a user-selectable option, providing, to the application executing on the client device of the first user, media items from a second playlist of media items associated with the respective text descriptor, wherein at least some of the media items from the second playlist are different from the media items in the first playlist of media items.

2. The method of claim 1, wherein the first user interface is a user interface for searching for media items.

3. The method of claim 1, further comprising:
   assigning, to each text descriptor of the one or more text descriptors associated with a respective media item, a respective confidence score.

4. The method of claim 1, further comprising:
   selecting a video related to the first playlist of media items associated with the first text descriptor to display with the first text descriptor.

5. The method of claim 1, wherein selecting the first text descriptor from the set of text descriptors includes:
   obtaining a second set of text descriptors corresponding to a listening history of the first user;
   comparing the second set of text descriptors against the set of text descriptors using the one or more first criteria; and
   selecting the first text descriptor in accordance with the comparing.

6. The method of claim 1, wherein selecting the first text descriptor from the set of text descriptors using the one or more first criteria includes:
   translating the set of text descriptors from the plurality of media items into a first set of embeddings in a vector space;
   translating a listening history of the first user into a second set of embeddings in the vector space; and
   identifying an embedding based on the first set of embeddings and the second set of embeddings, wherein the identified embedding corresponds to the first text descriptor.

7. The method of claim 1, wherein selecting the first text descriptor from the set of text descriptors using the one or more first criteria includes:
   inputting the set of text descriptors from the plurality of media items and a second set of text descriptors from a listening history of the first user into a trained machine learning model that is configured to output the first text descriptor using the set of one or more first criteria.

8. The method of claim 1, wherein:
   the one or more text descriptors includes a third text descriptor, different from the first text descriptor; and the method further comprises:

in response to user selection by the first user of the third text descriptor, providing, to the application executing on the client device of the first user, media items from a third playlist of media items associated with the third text descriptor, wherein the third playlist is distinct from the first playlist and the second playlist.

9. The method of claim 1, wherein the one or more text descriptors displayed in the second user interface change with each media item in the first playlist of media items.

10. The method of claim 1, wherein the respective text descriptor corresponds to a broader genre than the first text descriptor.

11. The method of claim 1, wherein:

the first playlist of media items includes a first media item; and the method further comprises:

selecting a first plurality of text descriptors for display with the first media item according to a lexical similarity criterion.

12. The method of claim 11, wherein:

the first playlist of media items includes a second media item; and the method further comprises:

selecting a second plurality of text descriptors for display with the second media item, wherein the first plurality of text descriptors includes at least one text descriptor that is distinct from the second plurality of text descriptors.

13. The method of claim 1, wherein the personalized pool of media items for the first user includes media items that are selected for the first user but that the first user has not previously played back.

14. The method of claim 1, wherein selecting the first text descriptor comprises ranking the set of text descriptors to form a first ranked list of the text descriptors and selecting the first text descriptor based on the first ranked list.

15. The method of claim 14, further including:

selecting, without user input, a second text descriptor from the set of text descriptors by analyzing the set of text descriptors using one or more second criteria, distinct from the one or more first criteria, wherein:

selecting the second text descriptor comprises ranking the set of text descriptors to form a second ranked list of the text descriptors, having a different order than the first ranked list of text descriptors, and selecting the second text descriptor based on the second ranked list.

16. A computer system associated with a media-providing service, comprising:

one or more processors; and memory storing one or more programs, the one or more programs including instructions for:

generating a personalized pool of media items that are personalized for a first user of the media-providing service based on a listening history of the first user;

obtaining a set of text descriptors from a plurality of media items in the personalized pool of media items personalized for the first user of the media-providing service, wherein each of the plurality of media items is respectively associated with one or more text descriptors;

selecting, without user input, a first text descriptor from the set of text descriptors by analyzing the set of text descriptors using one or more first criteria;

generating, without user input, a first playlist of media items from at least the personalized pool of media items personalized for the first user, wherein each media item in the first playlist of media items is selected for the first playlist of media items based at least on an association with the first text descriptor;

causing an application associated with the media-providing service, executing on a client device of the first user, to concurrently display a plurality of text descriptors including the first text descriptor in response to the selection of the first text descriptor:

causing the application associated with the media-providing service to transition from a first user interface of the application to a second user interface of the application;

while the second user interface is displayed, providing, to the application executing on the client device of the first user, media items in the first playlist of media items associated with the first text descriptor;

causing the application associated with the media-providing service, executing on a client device of the first user, to playback the provided media items in the first playlist and display, while playing back the provided media items, one or more text descriptors as user-selectable options, wherein the one or more text descriptors displayed as user-selectable options are distinct from the first text descriptor, wherein the one or more text descriptors are refinements of the first text descriptor and are displayed in the second user interface as user-selectable options that change with each media item in the first playlist of media items; and in response to detecting selection of a respective text descriptor displayed as a user-selectable option, providing, to the application executing on the client device of the first user, media items from a second playlist of media items associated with the respective text descriptor, wherein at least some of the media items from the second playlist are different from the media items in the first playlist of media items.

17. The computer system of claim 16, the one or more programs further including instructions for:

assigning, to each text descriptor of the one or more text descriptors associated with a respective media item, a respective confidence score.

18. The computer system of claim 16, the one or more programs further including instructions for:

selecting a video related to the first playlist of media items associated with the first text descriptor to display with the first text descriptor.

19. The computer system of claim 16, wherein the instructions for selecting the first text descriptor include instructions for ranking the set of text descriptors to form a first ranked list of the text descriptors and selecting the first text descriptor based on the first ranked list.

20. The computer system of claim 19, wherein the one or more programs further include instructions for selecting, without user input, a second text descriptor from the set of text descriptors by analyzing the set of text descriptors using one or more second criteria, distinct from the one or more first criteria, wherein:

selecting the second text descriptor include instructions for ranking the set of text descriptors to form a second ranked list of the text descriptors, having a different order than the first ranked list of text descriptors, and selecting the second text descriptor based on the second ranked list.

21. A non-transitory computer-readable storage medium storing one or more programs for execution by a computer system associated with a media-providing service, the computer system having one or more processors, the one or more programs comprising instructions for:

generating a personalized pool of media items that are personalized for a first user of the media-providing service based on a listening history of the first user;

obtaining a set of text descriptors from a plurality of media items in the personalized pool of media items personalized for the first user of the media-providing service, wherein each of the plurality of media items is respectively associated with one or more text descriptors;

selecting, without user input, a first text descriptor from the set of text descriptors by analyzing the set of text descriptors using one or more first criteria;

generating, without user input, a first playlist of media items from at least the personalized pool of media items personalized for the first user, wherein each media item in the first playlist of media items is selected for the first playlist of media items based at least on an association with the first text descriptor;

causing an application associated with the media-providing service, executing on a client device of the first user, to concurrently display a plurality of text descriptors including the first text descriptor;

in response to the selection of the first text descriptor:

causing the application associated with the media-providing service to transition from a first user interface of the application to a second user interface of the application;

while the second user interface is displayed, providing, to the application executing on the client device of the first user, media items in the first playlist of media items associated with the first text descriptor;

causing the application associated with the media-providing service, executing on a client device of the first user, to playback the provided media items in the first playlist and display, while playing back the provided media items, one or more text descriptors as user-selectable options, wherein the one or more text descriptors displayed as user-selectable options are distinct from the first text descriptor, wherein the one or more text descriptors are refinements of the first text descriptor and are displayed in the second user interface as user-selectable options that change with each media item in the first playlist of media items; and in response to detecting selection of a respective text descriptor displayed as a user-selectable option, providing, to the application executing on the client device of the first user, media items from a second playlist of media items associated with the respective text descriptor, wherein at least some of the media items from the second playlist are different from the media items in the first playlist of media items.

* * * * *